March 4, 1952     D. F. SHELDON ET AL     2,587,775

APPARATUS FOR DETERMINING THE SPEED OF OBJECTS

Filed May 6, 1950     2 SHEETS—SHEET 1

*INVENTOR.*
DONALD F. SHELDON
GEORGE F. JENKENS
BY
*Joseph E Ryan*
ATTORNEY

March 4, 1952  D. F. SHELDON ET AL  2,587,775
APPARATUS FOR DETERMINING THE SPEED OF OBJECTS
Filed May 6, 1950  2 SHEETS—SHEET 2
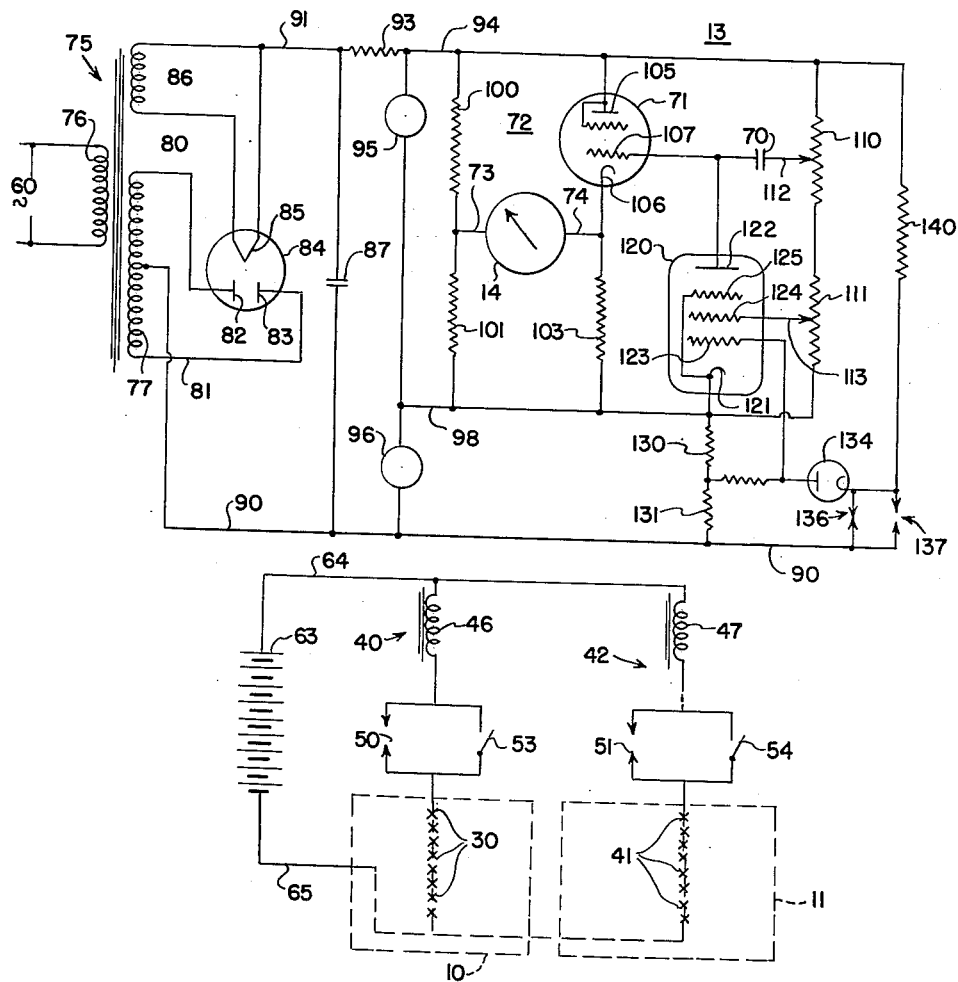
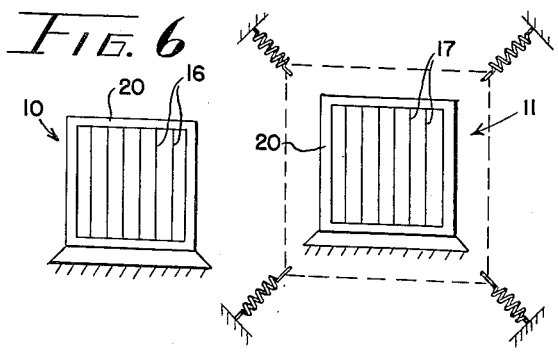
*INVENTOR.*
DONALD F. SHELDON
GEORGE F. JENKENS
BY
Joseph E. Ryan
ATTORNEY Patented Mar. 4, 1952

2,587,775

UNITED STATES PATENT OFFICE 2,587,775

APPARATUS FOR DETERMINING THE SPEED OF OBJECTS

Donald F. Sheldon and George F. Jenkins, Minneapolis, Minn.

Application May 6, 1950, Serial No. 160,482

5 Claims. (Cl. 161—18)

Our invention relates to apparatus for determining the speed of an object and more particularly to improved apparatus for sensing the presence of an object, such as a thrown ball, at spaced points with means to determine the speed of the object between the spaced points.

There are numerous types of apparatus to measure the speed of an object, but all are subject to various disadvantages, such as complexity of design, inability to withstand rugged usage, and the requirement that the object be accurately directed or propelled. Other apparatus of this general nature require the destruction or disassembly of parts of the apparatus in order to sense the presence of the object and determine its speed, thereby prohibiting multiple measurements without reassembly or rebuilding of the apparatus.

The present invention provides a speed measuring apparatus for a thrown or freely-propelled object which is capable of sensing the presence of the object over a large plane area at spaced points, the sensing portion of the apparatus controlling an interval measuring portion of the apparatus to measure the object's speed. The sensing portion of the apparatus is adapted to be physically contacted by the object as it passes between spaced measuring points without damaging or disassembling the sensing apparatus, thereby eliminating reassembly or repair and providing for repeatability or multiplicity of measurements. Further, the subject apparatus does not require that the object be accurately directed. The sensing portion of the apparatus includes a pair of spaced gridworks or sensing members, or one gridwork and a backstop member, each of which are adapted to be contacted by the object and when contacted, operate controlling means for an interval timer. The elapsed time interval, as the object passes between the gridworks or gridwork and backstop which are spaced apart a predetermined distance, is a measure of the speed of the object between the spaced gridworks or sensing members.

It is therefore an object of this invention to provide an improved apparatus for measuring the speed of an object.

It is also an object of this invention to provide improved apparatus for sensing the presence of an object at spaced points along its line of travel.

It is further an object of this invention to provide apparatus for sensing the presence of an object without causing destruction or damage to the sensing apparatus.

Another object of this invention is to provide a speed measuring apparatus which does not require that the object whose speed is to be measured be accurately thrown or directed.

Still another object of this invention is to provide apparatus for sensing the presence of an object at spaced points to measure its speed which includes at least one gridwork of flexibly mounted sensing members which are adapted to be contacted by the object in flight and permitting the object to pass therethrough.

Another object of this invention is to provide apparatus for determining the speed of an object which is simple in design, rugged in construction, and capable of continuous operation with a minimum of maintenance.

These and other objects of this invention will become apparent from a reading of the attached description together with the drawings wherein:

Figure 5 is a circuit diagram of the interval timing apparatus controlled by the gridworks for determining the speed of the object, and Figure 6 is another embodiment of the invention.

Our invention discloses apparatus for measuring the speed of an object which has utility as a measuring device and also as a novelty device. As previously noted, present methods of accomplishing such a measuring operation have been too complex, fragile and expensive to have utility particularly as a novelty device. The present apparatus is adapted to measure the speed of a thrown or freely-propelled object, such as a baseball, without requiring a high degree of accuracy in directing the ball. As a novelty device, it is particularly adapted for comparing competitive skills of persons throwing the object. The ruggedness and simplicity of parts in the detecting or sensing portion of the apparatus further permit unlimited consecutive measuring operations without requiring repair or replacements of parts.

Figure 1:
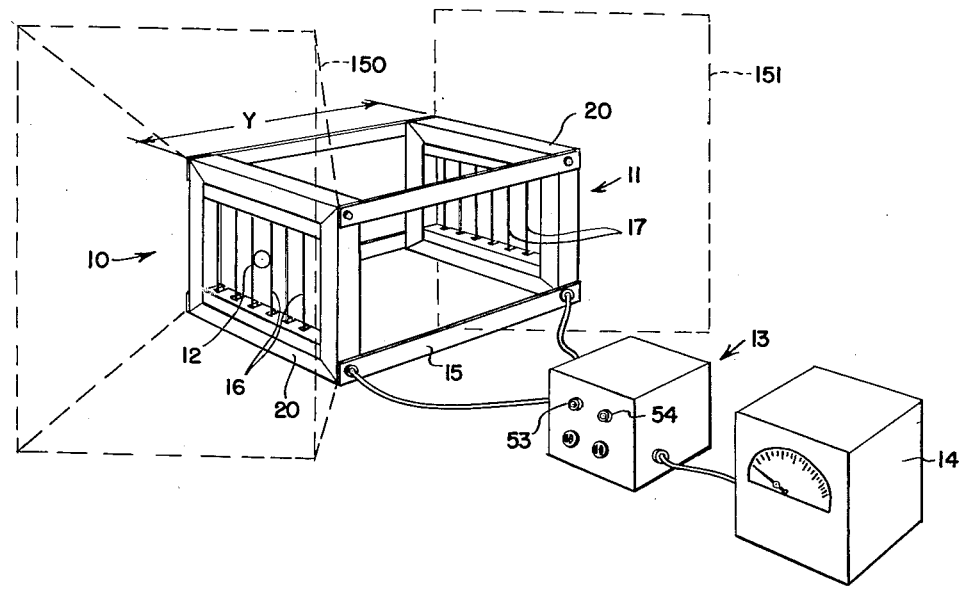
Figure 1 is a schematic showing of the apparatus forming the subject invention.

As is shown in Figure 1, our invention comprises a pair of gridworks 10 and 11 designed to sense or detect the presence of an object 12 in flight through physical contact with the object and an interval timer means, indicated at 13 together with a meter 14 to indicate the time required for the object to travel between the gridworks 10 and 11. Since the distance between the gridworks 10 and 11 is predetermined, the meter 14 indicating the elapsed time can be calibrated in terms of speed of the object.

Figure 2:
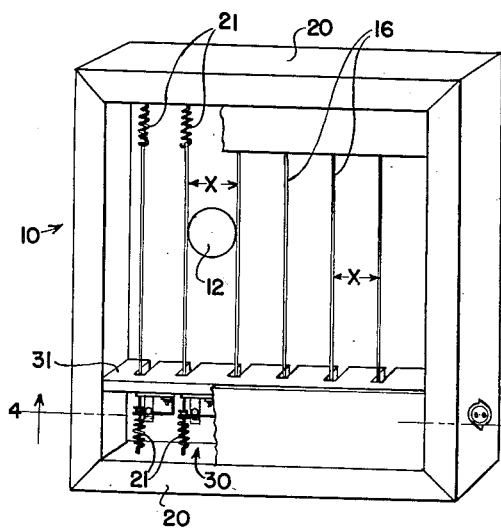
Figure 2 is a sectional view of one of the gridworks to disclose the relationship of parts.

Gridworks 10 and 11 are housed in a frame 15 which rigidly mounts the gridworks 10 and 11 parallel to one another and spaced apart a predetermined distance Y determined by the length of frame 15. The gridworks 10 and 11 are identical and each comprise a plurality of elongated members, 16 and 17 respectively, such as string or wires positioned parallel to one another. Members or wires 16 are each flexibly mounted on a rectangular-shaped frame 20 of either extremity by springs 21 or other suitable flexure means, as can be seen in Figure 2 and are equidistantly-spaced apart a predetermined distance, indicated at X, which distance is slightly less than the maximum or diametrical dimension of the object 12 or ball whose speed it is desired to measure. Members or wires 16 are made of a material having sufficient flexibility and strength to withstand direct impact with the object 12 as it is thrown or propelled through the gridworks 10 and 11 such that they will not break before the mounting spring 21 takes up or absorbs the shock of the impact. The members 16 and 17 are also chosen to be of such small diametrical dimension that the object 12 upon impact with one or more of the members 16 or 17 rolls over its surface and brushes aside said members as it passes through the gridworks 10 and 11 in its flight. By spacing the members 16 and 17 apart the distance X which is slightly less than the diametrical dimension of the object 12, contact with one or two of the members 16 and 17 is insured, irregardless of the position the object 12 passes through the gridworks 10 or 11. For purposes to be later described, it should be noted that the members 16 and 17 respectively of gridworks 10 and 11 theoretically define a pair of spaced parallel plane surfaces and the various points or point at which the object passes through the respective gridworks define points in space which are spaced apart a substantially predetermined constant distance Y. Thus, the time interval elapsing during the travel of the object between the spaced points when related to the distance Y gives a measure of speed of the object 12.

Figure 3:
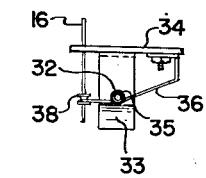
Figure 3 is a plan view of one of the controlling members operated by the gridwork.
Figure 4:
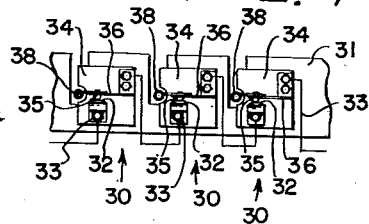
Figure 4 is a sectional view of a plurality of the controlling members showing the electrical connections thereto.

Members 16 and 17, as they are contacted by the object 12, move forward or to one side or in a combination of the two directions upon impact. Figure 2 shows in section a portion of gridwork 10 with a plurality of control devices 30 thereon which are adapted to be operated by this component of movement of the elongated members 16. The control means 30 are mounted on a bracket 31 suitably secured to the frame 20 of gridwork 10, which mounts the members 16, the bracket 31 being located near one extremity of the members 16, and extending normally thereto. The plurality of control means 30 are disclosed herein as electrical contact members which are spaced on the bracket 31 to be adjacent to a respective member or wire 16, and suitably attached to the bracket 31. The control means or contact devices comprise a stationary contact 32 with suitable lead attachment 33 mounted on plate 34 of insulating material and a movable or flexibly mounted contact member 35 similarly attached. The flexibly mounted contact 35, as best seen in Figures 3 and 4, includes a spring member 36 of electrically conductive material attached at one extremity to the plate 34 remote from stationary contact 32 and having contact element 35 suitably mounted thereon along its extent to contact or engage the stationary contact 32. The spring member 36 extends beyond contact member 35 and is bent into a loop 38 which is adapted to encircle a respective member or wire 16 near one of its spring 21 mounted extremities. By pretensioning the spring members 36, the movable contact element 35 may be made to engage the stationary element 32 in a normal position. Upon impact of the object 12 with one or more of the members 16, said member or members moves forward or to one side, moving or pulling the cooperating spring member 36, and hence the movable contact element 35 away from the stationary contact 32 breaking an electrical circuit therebetween.

The plurality of contact devices 30 or control means are adapted to be connected in a series relationship and in a controlling circuit 40 to be later described so that operation of any of the control means 30, opens the circuit in which they are positioned.

Although not shown, gridwork 11 has a plurality of contact means 41 associated therewith which are similar to the contacts 30 of gridwork 10 and are operated in the same manner by the members 17. These contacts are also serially connected in a separate controlling circuit 42 which will be described below.

The controlling circuits 40 and 42 formed by the serially connected contacts 30 and 41 of gridworks 10 and 11 respectively, as shown in Figure 5, include a pair of fast dropout relays 46 and 47 in series therewith, the circuits being energized from a battery source 63. Also included in the energization circuits 40 and 42 for the relays are normally opened contacts 50, 51 of the respective relays 46, 47 which act as holding contacts with a pair of manually operative switches 53, 54 in parallel therewith for resetting or reenergizing the dropout relays 46, 47 when the respective controlling circuits 40, 42 are broken. The energization circuit 40 for the relay 46 is as follows: battery 63, conductor 64, relay 46, holding contact 50 and manual switch 53 in parallel, contacts of control means 30 of gridwork 10 and conductor 65 back to source 63. Relay 47 is connected in a parallel relationship with relay 46 and in series with the source 63 as follows: source 63, conductor 64, relay 47, holding circuit 51 and manual switch 54 in parallel, contacts of control means 41 of gridwork 11 and conductor 65 to source 63.

The relays 46 and 47 are utilized herein to control a source of constant current for charging a condenser 70, which charge is a measure of the time elapse between the operation of the relays 46, 47 and hence the time taken for the object 12 to travel between the gridworks 10 and 11 and operate the respective control means 30, 41 associated therewith. The charge on the condenser 70 provides a controlling bias on a tube 71 in one leg of a bridge type measuring circuit 72 unbalancing the bridge circuit and causing meter 14 connected across output terminal 73, 74 of the bridge 72 to indicate bridge unbalance and hence the magnitude of charge. This method of measuring a time interval is a known one, and is disclosed herein as one method of accomplishing this operation.

The measuring and indicating apparatus 13 which is shown in Figure 5 will now be described in detail.

A transformer 75 is connected to the single phase A.-C. supply 60 for the timing apparatus 13. The transformer 75 has a primary winding 76 and a center tapped secondary winding 77, the extremities 80, 81 of which are connected to plates 82, 83 of full wave rectifier 84 in a conventional rectifier system. Rectifier 84 has its cathode 85 connected across a second secondary winding 86 of transformer 75. Conductors 90, 91 which are connected to the center tapped secondary 77 and the cathode 85 respectively supply a D.-C. current to the remaining portion of the measuring apparatus. A condenser 87 connected between conductors 90, 91 operates to smooth and filter this D.-C. input. A resistor 93 connected to conductor 91 at one extremity and to a conductor 94 at the other extremity serves as a dropping resistor for a pair of voltage regulating devices 95, 96. The voltage regulating devices 95, 96 are connected in series across conductors 90, 94 to divide the voltage supply and regulate the same. Across tube 95 and in a parallel relation therewith is connected by conductors 94, 98 a pair of resistors 100, 101. Resistors 100, 101 are further connected in parallel with a tube 71 and a resistor 103 in a parallel relationship therewith by conductors 94, 98 to form the Wheatstone bridge circuit 72 with regulating tube 95 serving as the input and a meter 14 connected across output terminals 73, 74 between resistors 100, 101 and tube 71 and resistor 103 respectively. Tube 71 is shown as a screen grid tube connected as a triode with an anode 105 connected to conductor 94, a cathode 106 connected to resistor 103, and output terminal 74, and a control grid 107 connected to condenser 70 for purposes which will become evident as this disclosure proceeds.

Also connected in parallel with the bridge 72 described above by conductors 94, 99 are potential dividers 110, 111 in series. Condenser 70 which is connected to control grid 107 of tube 71 is connected to a wiper 112 of divider 110 so that divider 110 supplies a control voltage to grid 107 of tube 71 to vary the impedance of tube 71 permitting it to match the resistances 100, 101, 103 forming bridge 72. Bridge 72 is so constructed that it will normally be balanced with no voltage or current flow being impressed on meter 14.

A pentode 120 having a cathode 121, an anode 122, a control grid 123, a screen grid 124 and a suppressor grid 125, has its cathode 121 connected to conductor 98 while its anode 122 is connected to condenser 70 and control grid 107 of tube 71. Potential divider 111 has a wiper 113 connected to screen grid 124, while suppressor grid 125 is connected to cathode 121.

Connected across regulating tube 95 are series connected resistors 130, 131 with a resistor 132 connected to their common point at one extremity. Resistor 132 is connected to a rectifying tube 134 and control grid 123 of tube 120 at its other extremity. Rectifier tube 134 is further connected at its cathode through contacts 136, 137 of relays 46, 47 respectively to conductor 90 leading to voltage regulating tube 95 and through a resistor 140 to conductor 94 common to voltage regulating tube 95.

*Operation*

The apparatus of the subject invention, when used as a novelty device to determine the speed of a thrown baseball, is generally set as in the manner disclosed in Figure 1. Canvas side drops 150, shown in phantom, shield the apparatus from contact with the object other than at the gridworks 10, 11 and in directing the ball, if inaccurately thrown, through the gridworks. A canvas backdrop 151, also shown in phantom, stops the forward movement of the ball after it has passed through the measuring apparatus.

In a normal, or inoperative position, the wires 16, 17 of gridworks 10, 11 are untouched and hence the respective contacts 30, 41 operated thereby are in a normally closed position. The contacts 30, 41 are opened only when the ball 12 or object contacts the wire 16 or 17 associated therewith as it passes through the gridworks 10, 11.

Before each reading or measurement of the speed of the object, manual switches 53, 54 must be momentarily closed causing the relays 46, 47 of amplifier 13 to be energized through the circuits described above. When energized, the normally open contacts 50, 51 of relays 46, 47 respectively are closed setting up holding circuits for the relays after which switches 53, 54 must be opened. The relays 46, 47 will thereafter remain energized until the respective contact circuits 40, 42 of the gridworks 10, 11 are broken sequentially by the passing of the object 12 therethrough. With relays 46, 47 energized, normally open contact 136 of relay 46 is made and normally closed contact 137 of relay 47 is open. When the ball or object 12 passes through the respective gridworks 10, 11, the relay 46 is first deenergized opening contact 136 and then relay 47 is deenergized closing contact 137. When the object or ball 12 has passed through gridwork 10, and has not passed through gridwork 11, both of the contacts 136, 137 of relays 46, 47 respectively will be open. The purpose of this contact arrangement will become evident as the disclosure proceeds.

The remaining portion of the measuring apparatus 13 is comprised of tube 120 which charges condenser 70 with a constant A.-C. voltage and the bridge circuit 72 which includes as one of its legs the impedance tube 71, the impedance of which is varied by the charge placed on the condenser 70.

The pentode tube 120, as described above, is connected across the D.-C. supply, and in series with condenser 70 with its grid bias being supplied by currents flowing in resistors 130 and 132. The charging current of tube 120 is adjusted by the potential on screen grid 124 supplied by voltage divider 111. Control grid 123 is biased by the voltage drop across resistor 140 and is adjusted to cut off tube 120. Tube 134 serves as a rectifier to limit the direction of current flow through resistors 130, 132 and 140 biasing tube 120 to maintain this cut off condition. With one or the other of the relay contacts 136, 137 closed, current flow is maintained across resistor 140 sufficient to bias the charging tube 120 to cut off and when both contacts 136, 137 are open, the current flow through resistor 140 is reduced to zero, so that the previously adjusted charging current will flow into condenser 70 as long as this condition of relay operation is maintained.

Tube 71 forming a part of bridge 72 is normally biased through the voltage derived from potentiometer 110 such that its impedance will match resistor 100 and the bridge 72 will be in a balanced condition. The meter 14 will therefore register no signal output from the bridge.

With tube 120 conducting, that is, under the condition when the ball 12 is passing between gridworks 10, 11, the charging current of tube 120 will flow into condenser 70 changing the bias on tube 71, unbalancing bridge 72 causing an indication of this unbalance on the meter 14 to register. The rate of change of capacitor voltage caused by the combined action of leakage and grid current is so low that the drift of the meter 14 is substantially negligible giving ample time for the reading of the meter. Since the charging current can, prior to the measuring operation, be predetermined and the capacity of the condenser 70 be also determined for a given deflection of the meter 14, the time required to charge the condenser 70 to this point can be calculated. This time corresponds to the time elapse between the operation of relays 46, 47 and hence the time taken for the object 12 to travel the predetermined distance Y between the gridworks 10, 11. Meter 14, therefore, with these facts known, is calibrated in terms of speed of the object 12 between the gridworks 10, 11.

Once the measurement is made, relays 46, 47 are placed in an energized condition by the operation of switches 53, 54 and these switches thereafter are opened before the next ball is thrown or the next measurement of speed of the object taken.

The embodiment of the invention disclosed schematically in Figure 6 is similar to the preferred embodiment except that the second gridwork 11 is modified such that the object 12 does not pass therethrough. As suggested by schematic disclosure of Figure 6, the gridworks 10 and 11 are not mounted together in close spaced relationship on a common frame but can be spaced apart a larger predetermined distance by means (not shown) with a spring mounted backdrop 155 located immediately in front of the gridwork 11. The parts of the gridworks 10, 11 remain unchanged and hence will not be described here. The operation of this embodiment is also similar to that of the preferred embodiment with the exception that the object 12 after passing through gridwork 10 will strike the backdrop 155 causing it to move slightly forward until one or more of the members 17 of gridwork 11 are contacted thereby operating cooperating contacts 41 therein. Since this embodiment does not require that the object pass through the second sensing device (gridwork 11), it will be readily apparent that any other type of controller or arrangement capable of operation by movement of the backdrop may be substituted for gridwork 11.

While the disclosure above is directed specifically to a particular type of apparatus forming a novelty device, it is to be understood that it may have a variety of uses and may take different forms within the meaning of our invention. Therefore, we wish to be limited only by the appended claims.

We claim as our invention:

1. Novelty apparatus for sensing the presence of a thrown baseball at any point on a predetermined plane surface area without interrupting its flight, comprising, a four sided frame member defining the periphery of said plane surface area, a plurality of wire like members of flexible material, a plurality of springs each mounted at one extremity on diametrically opposed sides of said frame member and mounting one of said wire like members at the other extremity thereof such that said wire like members stretch between said sides of said frame in spaced parallel relationship to define said plane surface area, said wire like members being spaced apart slightly less than the diametrical dimension of a baseball such that a thrown baseball may pass between said wire like members moving said members slightly apart and slightly forward from their position in said plane surface area, a plurality of contact means mounted on said frame and each including a stationary and a moveable portion biased together in a normal circuit closure position, and means included on each of said moveable portions of said contact means encircling respectively one of said wire like members.

2. Novelty apparatus for sensing the presence of a thrown baseball at any point on a predetermined plane surface area without interrupting its flight, comprising, a frame member defining the periphery of said plane surface area, a plurality of wire like members of flexible material, a plurality of biasing means each mounted at one extremity on said frame member and mounting one of said wire like members at the other extremity thereof such that said wire like members stretch across said frame member between diametrically opposed positions thereon in a spaced parallel relationship to define said plane surface area, said wire like members being spaced apart a distance slightly less than the diametrical dimension of a baseball such that a thrown baseball may pass between said wire like members moving said members slightly apart and slightly forward in the direction of travel of the baseball, and a plurality of contact means mounted on said frame member and adapted to be operated by said wire like members as they are moved in the direction of flight of a thrown baseball.

3. Novelty apparatus for sensing the presence of a thrown baseball at any point on a predetermined plane surface area without interrupting its flight, comprising, a frame member having two mounting arms, a plurality of wires positioned to extend between said mounting arms to define said predetermined plane surface area and being spaced apart slightly less than the diametrical dimension of a baseball, a plurality of flexible means for mounting each of said wires at the extremities thereof on said mounting arms, said flexible mounting means permitting said wires when they are contacted by a thrown baseball to move in the general direction of travel of a thrown baseball providing a passage way for the baseball therebetween without substantially effecting the flight and speed of travel thereof, a plurality of contact means mounted on said frame member and each associated respectively with one of said wires, each of said contact means being positioned normally out of physical contact with said wires and being adapted to be operated by movement of its associated wire when said wire is contacted by a thrown baseball, circuit means connecting said contact means in a series relationship, and means operated by the operation of any one or more of said contact means to indicate the presence of a baseball on the plane surface area.

4. Novelty apparatus for sensing the speed of a thrown baseball between two predetermined plane surface areas without interrupting the flight of the baseball, comprising, a pair of frame members positioned in spaced parallel relationship and separated a predetermined distance, said frame members each having a pair of mounting arms, a plurality of wires positioned to extend between said mounting arms to define the plane surface area, said wires being spaced apart a distance slightly less than the diametrical dimension of a baseball, a plurality of flexible means for mounting each of said wires at the extremities thereof on the mounting arms of each of said frame members, said flexible mounting means permitting said wires on each of said frame members when contacted by a thrown baseball to move in the general direction of travel of the baseball and thereby provide a passage way for the baseball there-between without substantially effecting the flight and speed of travel thereof, a plurality of contact means mounted on each of said frame members and each associated with one of said wires, each of said contact means being positioned normally out of physical contact with said wires and being adapted to be operated by movement of its associated wire then the wire is contacted by the baseball, a pair of electrically independent circuits connecting the contact means of each of said frame members in a series relationship, a pair of rapid operating relay members operated respectively by the operation of any one or more of said contact means associated with each of said frame members, a condenser charging circuit operated by the operation of the relay means whose operation is controlled by the circuit associated with the frame member first contacted by the baseball in flight and terminated by the operation of the relay means whose operation is controlled by the circuit associated with the frame member last contacted by the baseball in flight, condenser means connected to said condenser charging circuit, means for measuring the charge on the condenser and determining the time interval during which said condenser is charged, and means converting said time interval into the visual indication of the speed of the baseball between said frame members.

5. Novelty apparatus for sensing the speed of a thrown baseball between two predetermined plane surface areas without interrupting the flight of the baseball, comprising, a pair of frame members positioned in spaced parallel relationship and separated a predetermined distance, said frame members each having a pair of mounting arms, a plurality of wires positioned to extend between said mounting arms to define the plane surface area, said wires being spaced apart a distance slightly less than the diametrical dimension of a baseball, a plurality of flexible means for mounting each of said wires at the extremities thereof on the mounting arms of each of said frame members, said flexible mounting means permitting said wires on each of said frame members when contacted by a thrown baseball to move in the general direction of travel of the baseball and thereby provide a passageway for the baseball there-between without substantially effecting the flight and speed of travel thereof, a plurality of contact means mounted on each of said frame members and each associated with one of said wires, each of said contact means being positioned normally out of physical contact with said wires and being adapted to be operated by movement of its associated wire when the wire is contacted by the baseball, a pair of electrically independent circuits connecting the contact means of each of said frame members in a series relationship, a pair of rapid operating relay members operated respectively by the operation of any one or more of said contact means associated with each of said frame members, a condenser charging circuit operated by the operation of the relay means whose operation is controlled by the circuit associated with the frame member first contacted by the baseball in flight and terminated by the operation of the relay means whose operation is controlled by the circuit associated with the frame member last contacted by the baseball in flight, condenser means connected to said condenser and determining the time interval during which said condenser is charged, means converting said time interval into the visual indication of the speed of the baseball between said frame members, and further switching means for operating said pair of relay means to a normally inoperative position.

DONALD F. SHELDON.
GEORGE F. JENKINS.

REFERENCES CITED

The following references are of record in the file of this patent:

UNITED STATES PATENTS

| Number | Name | Date |
|---|---|---|
| 507,869 | Xiezopolski | Oct. 31, 1893 |
| 943,368 | Orance | Dec. 14, 1909 |
| 1,081,884 | Bertagnolli | Dec. 16, 1913 |
| 1,357,281 | Du Pont | Nov. 2, 1920 |
| 1,452,500 | Galerman | Apr. 24, 1923 |
| 1,489,566 | Webster | Apr. 8, 1924 |
| 1,889,813 | Smith | Dec. 6, 1932 |
| 1,925,483 | Dubois | Sept. 5, 1933 |
| 1,946,290 | Lord | Feb. 6, 1934 |
| 1,995,082 | Stotts | Mar. 19, 1935 |
| 2,075,147 | Stotts | Mar. 30, 1937 |
| 2,091,357 | Goldsmith | Aug. 31, 1937 |
| 2,205,945 | Estes | June 25, 1940 |
| 2,255,266 | Moorefield | Sept. 9, 1941 |
| 2,291,022 | Burbridge | July 28, 1942 |
| 2,294,730 | Eggers | Sept. 1, 1942 |
| 2,361,826 | Dowden | Oct. 31, 1944 |
| 2,400,189 | Carlson | May 14, 1946 |